United States Patent
Osaki et al.

(10) Patent No.: US 6,956,654 B2
(45) Date of Patent: Oct. 18, 2005

(54) DISPLACEMENT MEASURING DEVICE WITH INTERFERENCE GRATING

(75) Inventors: Motohiro Osaki, Kawasaki (JP); Masaki Tomiya, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 199 days.

(21) Appl. No.: 10/356,607

(22) Filed: Feb. 3, 2003

(65) Prior Publication Data
US 2003/0160966 A1 Aug. 28, 2003

(30) Foreign Application Priority Data
Feb. 25, 2002 (JP) .............................. 2002-048396

(51) Int. Cl.[7] .............................................. G01B 9/02
(52) U.S. Cl. .................................................... 356/494
(58) Field of Search .............................. 356/499, 494, 356/488

(56) References Cited

U.S. PATENT DOCUMENTS 5,035,507 A * 7/1991 Nishioki et al. ............ 356/499
6,166,817 A * 12/2000 Kuroda ....................... 356/499

FOREIGN PATENT DOCUMENTS

JP   A 1-185415   7/1989
JP   A 2000-81308   3/2000

* cited by examiner

*Primary Examiner*—Zandra V. Smith
*Assistant Examiner*—Patrick Connolly
(74) *Attorney, Agent, or Firm*—Oliff & Berridge, PLC (57) ABSTRACT

A displacement measuring device allows a plurality of light beams to be incident at positions on a scale or diffracted at points on a scale grating, which are farther spaced away from each other than the diameter of the light beams on the scale grating, and makes an angle of incidence of each light beam on the scale equal generally to an angle of transmission of the diffracted light beam of each light beam. This makes the strength of a detection signal impervious to variations in pitch angle and allows for providing good signals. Accordingly, it is possible to attach the device easily to an apparatus and provide improved ease of use for the device.

8 Claims, 6 Drawing Sheets

PRIOR ART

Fig. 7

DISPLACEMENT MEASURING DEVICE WITH INTERFERENCE GRATING

BACKGROUND OF THE INVENTION

1. Field of the Invention

The present invention relates to a displacement measuring device with an interference grating, which allows a light beam from a coherent light source to be incident on a scale in a plurality of directions and respective diffracted light beams to interfere with each other, thereby providing a detection signal. The device is suitable for use, among other things, in a linear encoder for measuring the relative displacement between a sensor portion and a scale, a measuring apparatus such as a linear gauge incorporating the linear encoder or a shape measuring apparatus, a measuring device such as for measuring inner and outer diameters, and apparatus for positioning or controlling the speed of a moving stage of a machining tool or an inspection machine.

2. Description of the Related Art

Optical encoders have become widely available which employ a scale having optical calibration markings formed at a constant pitch to generate cyclic detection signals. Furthermore, as one of the optical encoders of this type having an improved high resolution, a device with an interference grating for detecting displacement has been suggested, in which the scale is provided with calibration markings at a fine pitch using the holography technique so as to use the calibration markings as a diffraction grating to positively cause diffraction, thereby providing a detection signal.

Figure 1:
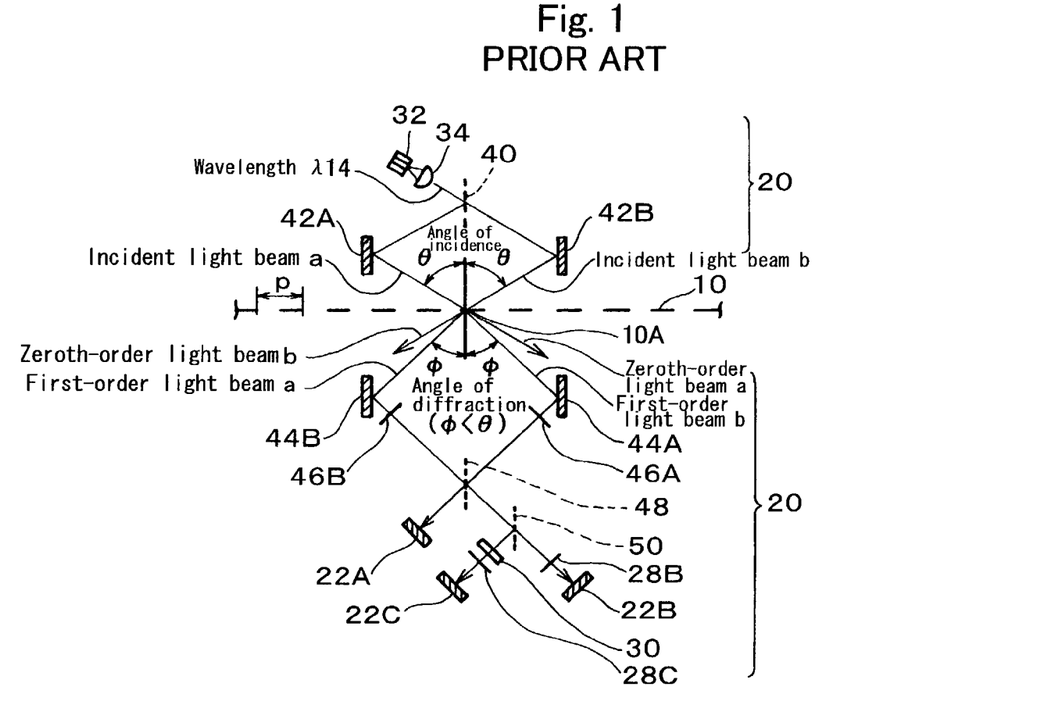
FIG. 1 is an optical path diagram illustrating the configuration of a prior art device with an interference grating for detecting displacement, which the present applicant has suggested in Japanese Patent Laid-Open Publication No. Hei. 1-185415.

FIG. 1 illustrates a device with an interference grating for detecting displacement, which the present applicant has suggested in Japanese Patent Laid-Open Publication No. Hei 1-185415. The displacement measuring device includes a scale 10 formed of a diffraction grating having a pitch p of the same order as a light source wavelength $\lambda$, for example, 1 $\mu$m or less. The device also includes a sensor portion 20 that has a coherent light source (also hereinafter simply referred to as a light source) 32, such as a laser diode (LD), for illuminating the diffraction grating with a laser beam 14 of a wavelength $\lambda$, a collimator lens 34, light-receiving elements 22A, 22B, and 22C for optoelectronic conversion of a combined wave of a plurality of light beams yielded by the diffraction grating, polarizers 28B, 28C, and a quarter-wave plate 30. The device is configured to generate a detection signal that varies periodically depending on the relative displacement between the scale 10 and the sensor portion 20. In this measuring device, the sensor portion 20 includes a half mirror 40 for halving the laser beam 14 from the light source 32, and a pair of mirrors 42A and 42B for allowing the halved laser beams to be incident symmetrically upon the same diffraction point 10A on the diffraction grating at the same angle of incidence $\theta$. The measuring device is further set to have an angle of incidence $\theta$ and an angle of diffraction $\phi$ ($\phi<\theta$) that differ from each other to such an extent that a zeroth-order light beam of one of the halved incident light beams a and b and a first-order (diffracted) light beam of the other light beam can be separated from each other on the diffraction grating. The separated first-order light beams are reflected on a pair of mirrors 44A and 44B to be polarized orthogonally to each other by polarizers 46A and 46B, and their respective combined wave is then allowed to be incident on the light-receiving elements 22A, 22B, and 22C through half mirrors 48 and 50.

In this displacement measuring device, a light beam is incident and diffracted on the scale 10 at the angle of incidence $\theta$ and the angle of diffraction $\phi$ which are different from each other. Additionally, since the device is adapted to measure the relative displacement between the scale 10 and the other portion (the sensor portion 20), the device is attached to other apparatus, so that the scale 10 and the sensor portion 20 are mounted on separate members to allow either one of them to be displaced.

Figure 2:
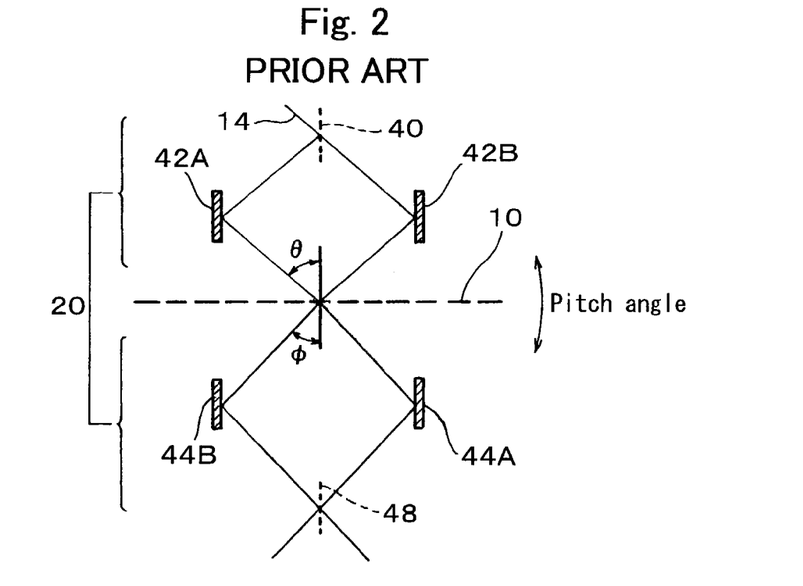
FIG. 2 is an optical path diagram illustrating the main portion of the optical path of FIG. 1.
Figure 3:
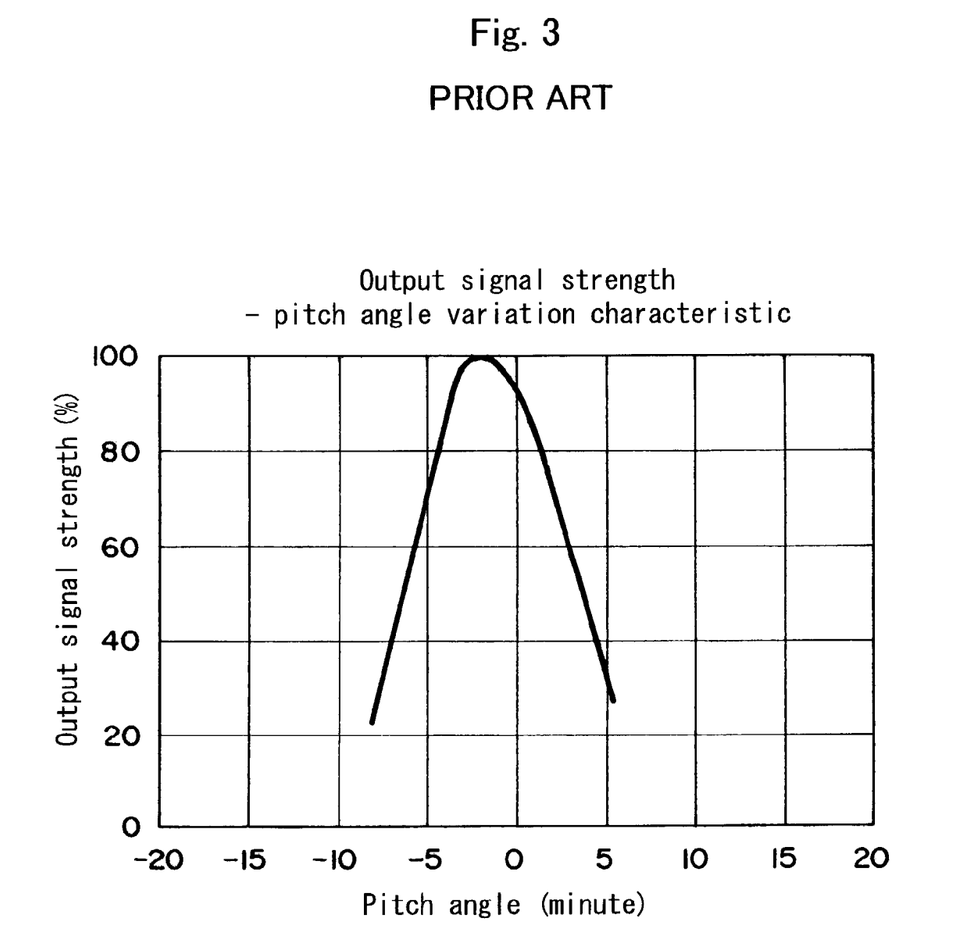
FIG. 3 is a graph showing the variation characteristic of the output signal strength against the pitch angle in the optical system of FIG. 1.

However, with the arrangement of this optical system, suppose that a pitch angle (the positional relationship of rotational directions on the drawing of FIG. 2 showing the main portion of the optical system) between the sensor portion 20 and the scale 10 is deviated from the proper position. In this case, the angle of transmission $\phi$ from the scale 10 takes on different values for the right and left optical paths. Thus, as shown in FIG. 3, the measured values of the output signal level against the pitch angle with the pitch angle being varied teach that the contrast is reduced due to interference, causing the output signal level to be degraded. This raised a problem that a sufficient performance could not be made available.

Accordingly, to make full use of the function of a device with an interference grating for measuring displacement which has the optical system shown in FIG. 1, it is necessary to adjust the pitch angle, when attached to an apparatus, so as to provide an output signal of the maximum level. Furthermore, an additional adjustment also needs to be made for another direction, thereby requiring adjustments for two directions. This raised another problem that it took time to attach the device to an apparatus.

Figure 4:
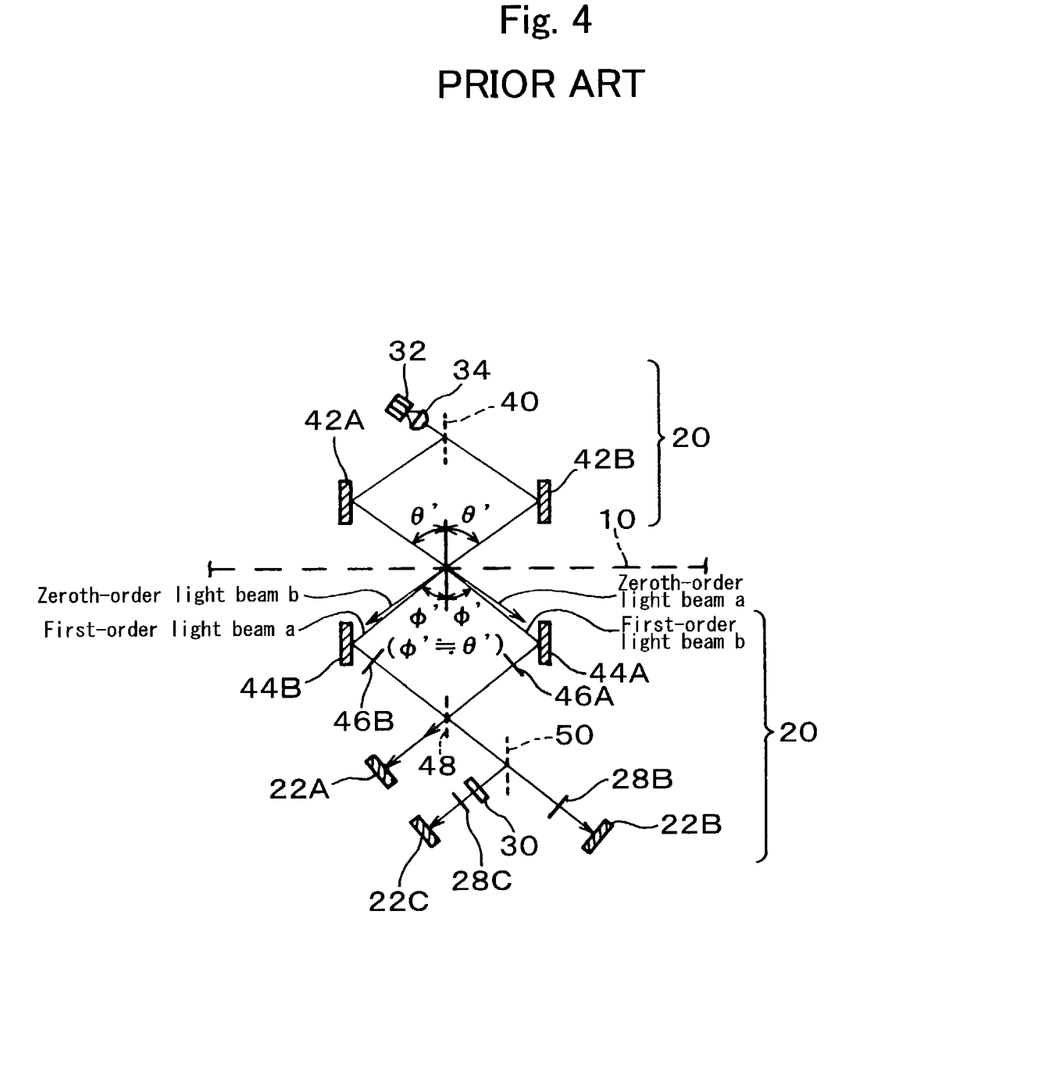
FIG. 4 is an optical path diagram illustrating the configuration of a modified example described by the present applicant in Japanese Patent Laid-Open Publication No. Hei. 1-185415.

In Japanese Patent Laid-Open Publication No. Hei. 1-185415, a modified example is also described in which the angle of incidence $\theta$ is generally equal to the angle of diffraction $\phi$ as shown in FIG. 4. However, since the zeroth-order light beam and the first-order light beam were inseparably mixed up with each other, good signals could not be obtained.

SUMMARY OF THE INVENTION

The present invention was developed in view of the aforementioned prior art problems. It is therefore an object of the present invention to make the strength of a detection signal impervious to variations in pitch angle and provide good signals, thus allowing the measuring device to be easily attached to an apparatus and provide improved ease of use for the measuring device.

The present invention provides a device with an interference grating for measuring displacement, which allows a light beam from a coherent light source to be incident on a scale in a plurality of directions and respective diffracted light beams to interfere with each other to provide a detection signal. The measuring device solves the aforementioned problems by being configured such that the plurality of light beams are incident on a scale grating at positions spaced farther away from each other than a diameter of the light beams on the scale grating, and an angle of incidence of each light beam on the scale and an angle of transmission of a diffracted light beam of each light beam are generally equal to each other.

The measuring device can also be configured such that the plurality of light beams are incident at separated positions on a surface of the scale, thereby being incident on the scale grating at positions spaced farther away from each other than a diameter of the light beams on the scale grating.

Alternatively, the measuring device can be configured such that the plurality of light beams are incident at one position on the surface of the scale and then travel a thickness of glass to the scale grating to be thereby incident on a scale grating at positions spaced farther away from each other than a diameter of the light beams on the scale grating.

The measuring device may be also provided with an aperture for limiting the diameter of light beams incident on the scale to ensure that the zeroth-order light beam and the first-order diffracted light beams are separated from each other.

The measuring device may also include means for intercepting a light beam transmitted from the scale among the plurality of light beams to further ensure that the zeroth-order light beam and the first-order diffracted light beam are separated from each other.

According to the present invention, a variation in the attachment angle between the scale and the detector causes only a small degradation in efficiency of detection signals, thereby eliminating alignment work for the device to be attached to an apparatus. The positional relationship between the measuring device and the apparatus can be satisfied only by the machining accuracy specification of a mounting reference surface. This allows for not only facilitating the handling of the optical device but also eliminating the need for a special adjustment mechanism, thereby making it possible to simplify the configuration and thus reduce the number of parts employed.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DETAILED DESCRIPTION OF THE PREFERRED EMBODIMENTS

Preferred embodiments of the present invention will be explained hereunder.

Figure 5:
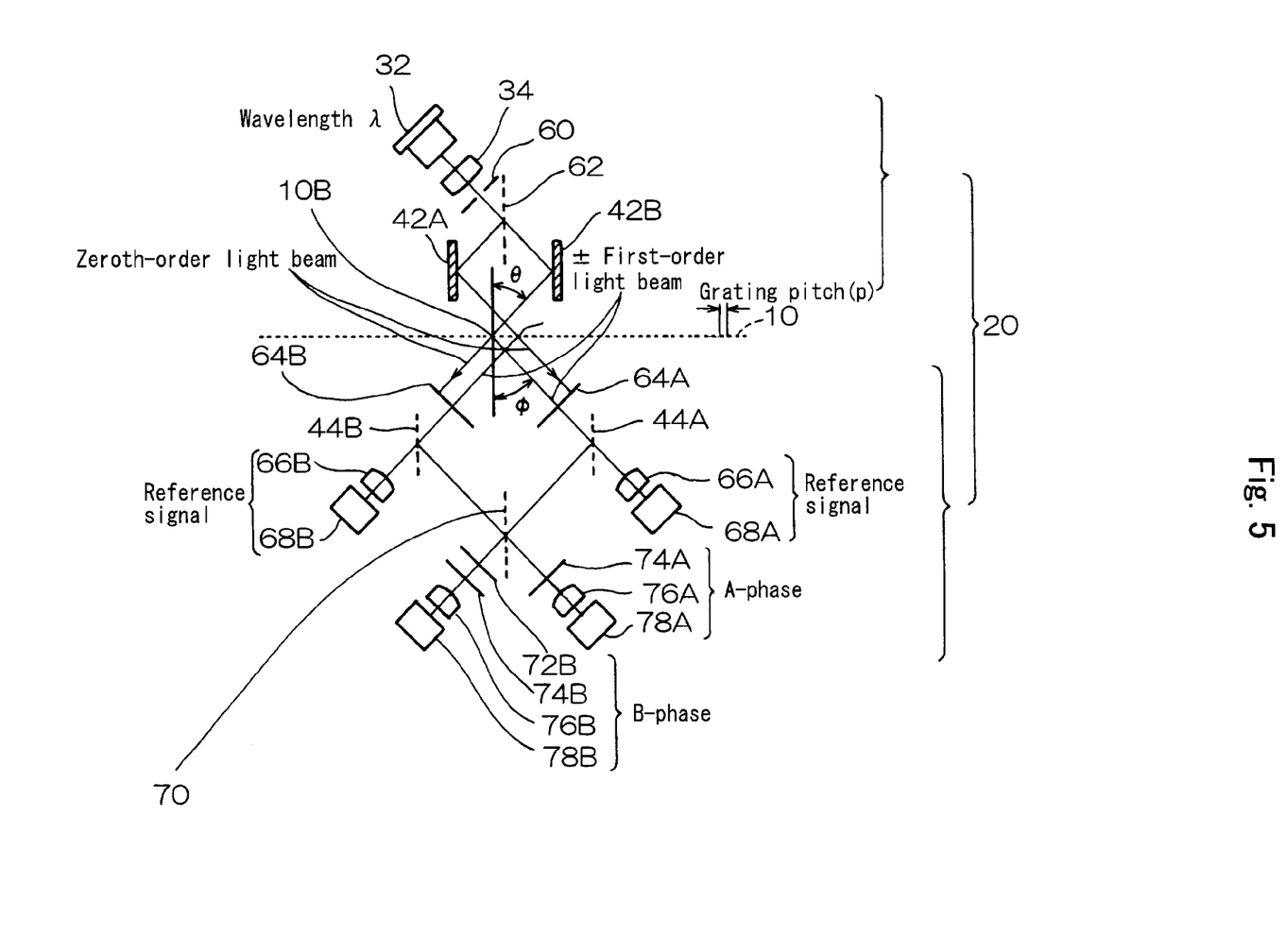
FIG. 5 is an optical path diagram illustrating a first embodiment of the present invention.

FIG. 5 shows a device with an interference grating for measuring displacement according to a first embodiment of the present invention, similar to the prior art measuring device device shown in FIG. 4. The measuring device according to this embodiment includes, for example, a circular aperture 60 provided near the transmitting side of a collimator lens 34 to limit the diameter of a light beam incident on a scale 10. In this measuring device, incident positions 10A and 10B of two light beams on the scale 10 are determined so as to be spaced sufficiently farther away from each other than the diameter of the light beam that is defined by the size of the aperture 60.

Furthermore, a polarizing beam splitter 62 is used instead of the half mirror 40 to change the polarization of the two light beams incident on the scale 10. Near the transmitting side of the scale 10, there are also provided polarizing plates 64A and 64B which are oriented so as to cut the zeroth-order polarized light beam and transmit the first-order polarized light beam.

As illustrated, there are provided lenses 66A and 66B and light-receiving elements 68A and 68B which are intended to acquire reference signals from the light beams passing through the half mirrors 44A and 44B, for example, to provide feedback control to the quantity of light of the LD 32, respectively. There is also provided a non-polarizing beam splitter (half mirror) 70. There are also provided a polarizing plate 74A, a lens 76A, and a light-receiving element 78A to acquire an A-phase signal from the light passing through the half mirror 70. There are also provided a quarter-wave plate 72B, a polarizing plate 74B, a lens 76B, and a light-receiving element 78B to acquire from the light passing through the half mirror 70 a B-phase signal shifted in phase by 90 degrees with respect to the A-phase signal.

In this embodiment, the light beam emitted from the LD 32 is collimated through the collimator lens 34, limited in light beam diameter by the aperture 60, and then halved by the polarizing beam splitter 62 into two orthogonal linearly polarized light beams.

The light beams are reflected on the mirrors 42A and 42B disposed laterally at diametrically opposed positions, respectively, and then incident at an angle $\theta$ upon two points 10A and 10B spaced farther from each other than the diameter of the light beams on the scale 10.

The ± first-order (diffracted) light beams through the scale 10 are transmitted at an angle of diffraction $\phi$ that is equal or generally equal to the angle of incidence $\theta$.

The following equation is given here to the relationship among the wavelength $\lambda$ of the light source, the grating pitch p of the scale being of the same order as the wavelength $\lambda$ of the light source, for example, 1 $\mu$m or less, the angle of incidence $\theta$, and the angle of diffraction $\phi$. That is, $$\sin \theta - \sin \phi = \lambda/p \quad (1)$$

When the scale 10 is displaced laterally in the drawing by a displacement d, the phases of the diffracted light beams are each shifted by d/p in the opposite directions. The displacement of the scale converted into the phase difference between the light beams is observed as an interference light intensity shifted by a d/2p cycle through the interference between the two light fluxes.

The diffracted light beams pass through the polarizing plates 64A and 64B that are oriented to allow their respective linearly polarized light components to transmit therethrough. On the other hand, although a transmitting light beam (the zeroth-order light beam) or a noise component is also transmitted from the scale at the same angle as the angle of incidence $\theta$, the light fluxes of the ± first-order light beams and the zeroth-order light beam do not overlap each other because the light beams are diffracted at the two points spaced farther from each other than the light beam diameter as described above. Additionally, since the polarizing plates 64A and 64B are positioned so as to intercept the zeroth-order light beam, most of the light beam does not transmit therethrough. The light beam cannot be completely intercepted here because the light beam incident upon the polarizing plates 64A and 64B has not been subjected to a perfect linear polarization due to the degree of polarization of the light source 32 and the polarization function of the polarizing beam splitter 62.

The diffracted light beams having passed through the polarizing plates 64A and 64B are each reflected on the half mirrors 44A and 44B that are laterally disposed at diametrically opposed positions, and then incident upon the non-polarizing beam splitter 70 disposed at the center.

At this stage, the light beams having passed through the half mirrors 44A and 44B are incident upon the light-receiving elements 68A and 68B via the lenses 66A and 66B to be a reference signal. Like the prior art example shown in FIG. 1 or FIG. 4, it is also possible to eliminate any one of the light-receiving elements 68A and 68B to employ only the other one.

The two linearly polarized light beams incident upon the non-polarizing beam splitter 70 are each halved to be transmitted therethrough and reflected thereon and then directed toward the light-receiving elements 78A and 78B through the same optical paths, respectively.

In one optical path (the right optical path in the drawing), the polarizing plate 74A is disposed at an orientation of 45 degrees to interfere the two light beams with each other, thereby allowing the light-receiving element 78A to convert the position of the scale into an electrical signal strength for output.

In the other optical path (the left optical path in the drawing), the quarter-wave plate 72B is further placed to cause only one of the linearly polarized light beams to lag in phase by 90 degrees and also pass through the polarizing plate 74B for interference, thereby being converted into an electrical signal having a phase difference of 90 degrees.

The two signals having a phase difference of 90 degrees that have been obtained at the light-receiving elements 78A and 78B are processed, thereby making it possible to determine the direction of displacement of the scale.

At this time, the transmitted light beams (the zeroth-order light beam) from the scale that have not been cut by the polarizing plates 64A and 64B are also directed toward the light-receiving elements. However, since these light beams deviate from the optical paths by the diameter of the light beams or more, the light beams would not interfere with the valid light beams, causing no degradation of output signals. This allows for yielding perfect interference between two light fluxes and thereby delivering a substantially ideal sinusoidal signal.

The light beams transmitted from the right and left half mirrors 44A and 44B are each used to monitor the intensity of the diffracted light beams and thereby control the quantity of light of the LD 32 to provide a constant intensity.

Figure 6:
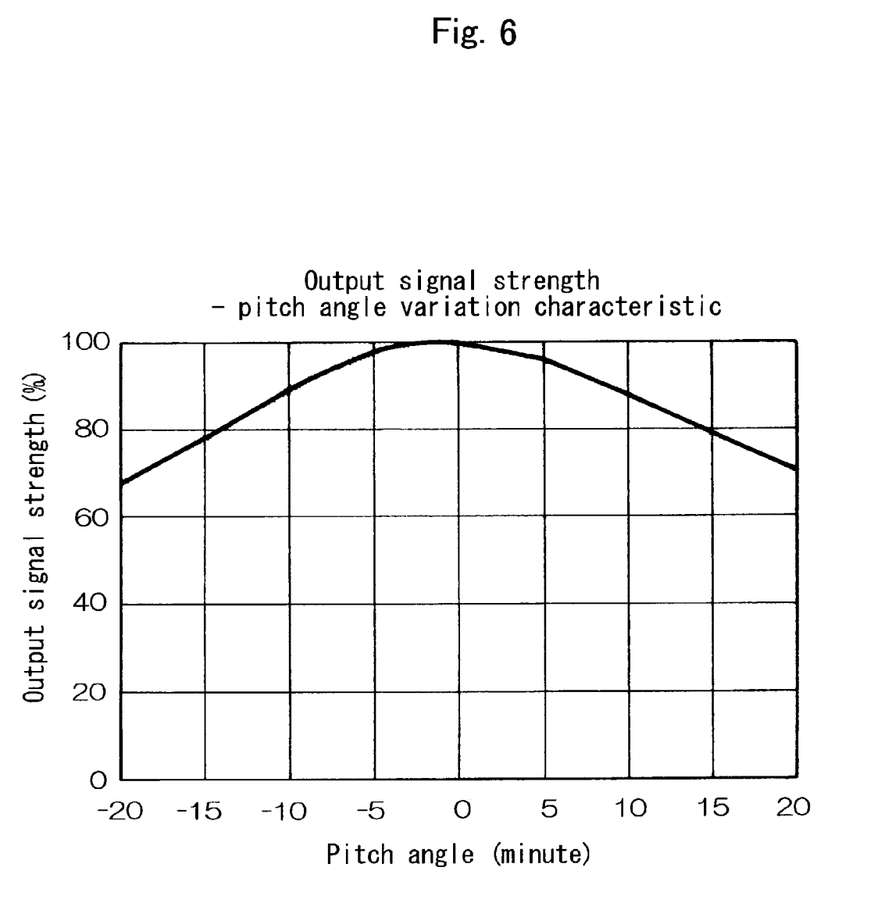
FIG. 6 is a graph showing an exemplary variation characteristic of the output signal strength against the pitch angle according to the first embodiment.

FIG. 6 shows the measured values of the signal strength against the pitch angle of the scale according to this embodiment. It can be seen that the drop in strength of the output signal against the pitch angle is reduced when compared with that of FIG. 3.

The angle of incidence $\theta$ is made equal or substantially equal to the angle of diffraction $\phi$ as described above. This hardly causes a difference in angle of incidence of the light beams, having passed through the right and left optical paths, on the light-receiving elements even in the presence of a variation in pitch angle. This is because of the following reason. That is, the angles $\theta$ and $\phi$ are inversely proportional to each other from Equation (1) expressing the relationship between the angle of incidences $\theta$ and the angle of diffraction $\phi$. When the angles $\theta$ and $\phi$ are generally equal to each other, the sum of the angles $\theta$ and $\phi$ is generally constant. This hardly causes a difference in angle between the light beams having passed through the right and left optical paths, thereby making the signal almost free from a degradation in its strength.

Since this embodiment is provided with the circular aperture 60, the diameter of an incident light beam can be reduced, thereby reducing the amount of separation between the incident positions of the light beams on the scale 10. The aperture 60 is not limited in shape to a circular one, and can even be eliminated when the diameter of an incident light beam is originally small or the device has an allowable size.

Furthermore, in this embodiment, the light beams incident on the scale are differently polarized and the polarizing plates 64A and 64B are provided near the transmitting side of the scale to intercept the zeroth-order light beams, thereby making it possible to positively reduce the effects of noise. Depending on the condition, it is also possible to employ a half mirror instead of the polarizing beam splitter 62, and eliminate the polarizing plates 64A and 64B.

Figure 7:
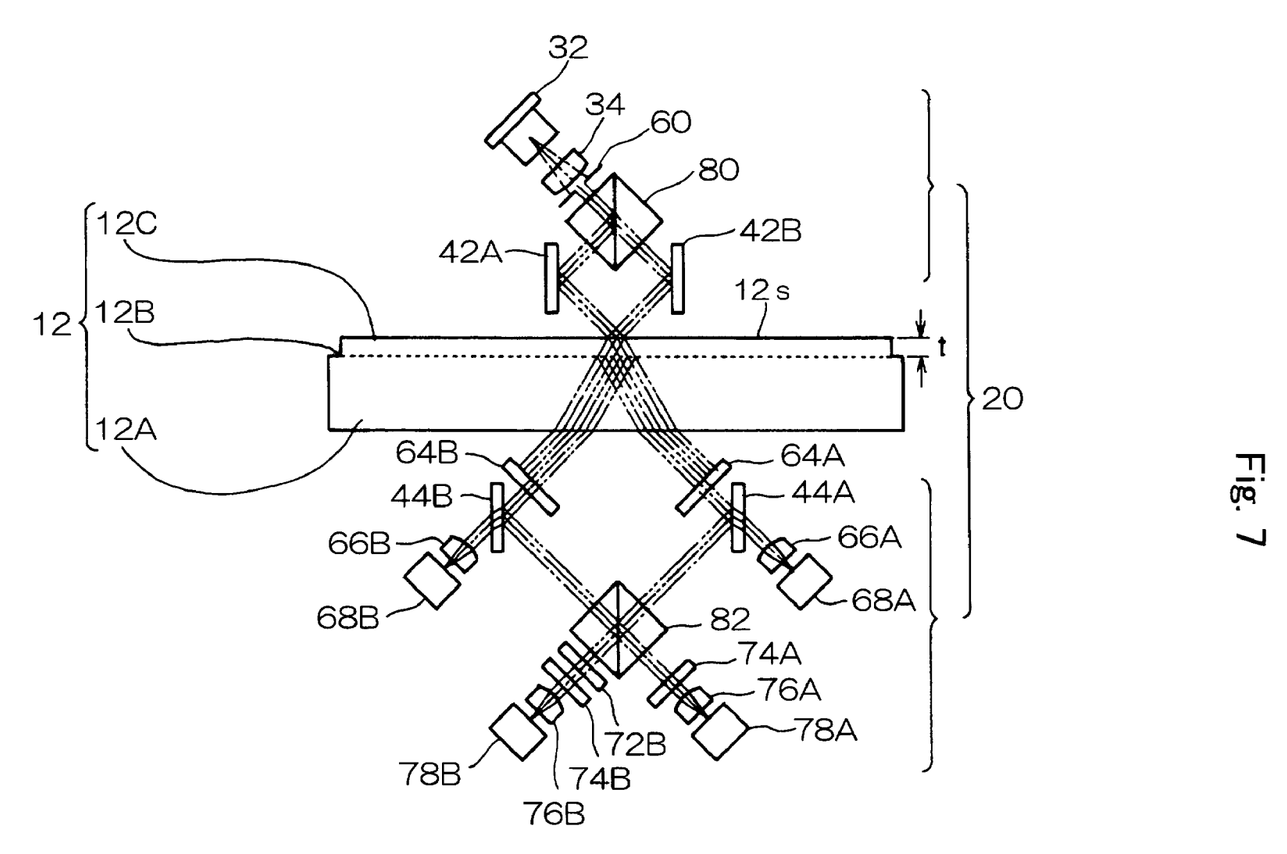
FIG. 7 is an optical path diagram illustrating a second embodiment of the present invention.

Now, Referring to FIG. 7, a second embodiment of the present invention will be explained below in detail.

This embodiment provides a device with an interference grating for measuring displacement, in which a scale grating 12B is formed on a glass substrate 12A, and a scale 12 coated with glass 12C is further provided on the scale grating 12B. The measuring device employs prisms 80 and 82 instead of the polarizing beam splitter 62 and the non-polarizing beam splitter 70 of the first embodiment. With this arrangement, light beams are incident at a point on a surface 12S of the scale 12 (i.e., the surface of the glass 12C) but are separated farther than the diameter of the light beams after having traveled a thickness t of the glass 12C to be incident on the scale grating 12B.

The other features of this embodiment are the same as those of the first embodiment, and the same components are designated with the same reference symbols and will not be further detailed.

According to this embodiment, a plurality of light beams are incident at one point on the surface of the glass 12C, thereby hardly causing errors due to undulations of the surface of the glass (on the side of incidence).

Although certain preferred embodiments have been shown and described, it should be understood that many changes and modifications may be made therein without departing from the scope of the appended claims.

What is claimed is:

1. A device with an interference grating for measuring displacement, the device allowing a light beam from a coherent light source to be incident on a scale in a plurality of directions and respective diffracted light beams to interfere with each other to provide a detection signal, the plurality of light beams being incident on a scale grating at positions spaced farther away from each other than a diameter of the light beams on said scale grating, an angle of incidence of each light beam on the scale and an angle of transmission of a diffracted light beam of each light beam being generally equal to each other, and the device including at least one polarizing plate for each light beam, the at least one polarizing plate positioned between the scale and all light-receiving elements to intercept a zeroeth-order light beam and transmit a first-order light beam to decrease a noise component.

2. The device with an interference grating for measuring displacement according to claim 1, wherein
said plurality of light beams are incident at separated positions on a surface of the scale, thereby being incident on the scale grating at positions spaced farther away from each other than a diameter of the light beams on the scale grating.

3. The device with an interference grating for measuring displacement according to claim 2, wherein
means for separating the positions of incidence of said plurality of light beams on the scale grating includes a polarizing beam splitter and a mirror.

4. The device with an interference grating for measuring displacement according to claim 1, wherein
said plurality of light beams are incident at one position on the surface of the scale and then travel a thickness of glass to the scale grating to be incident on the scale grating at positions thereby spaced farther away from each other than a diameter of the light beams on the scale grating.

5. The device with an interference grating for measuring displacement according to claim 4, wherein
means for separating the positions of incidence of said plurality of light beams on the scale grating is a prism.

6. The device with an interference grating for measuring displacement according to claim 1, wherein
the device is provided with an aperture for limiting a diameter of light beams incident on said scale.

7. The device with an interference grating for measuring displacement according to claim 6, wherein
said aperture is circular in shape.

8. The device with an interference grating for measuring displacement according to claim 1, further comprising means for intercepting a light beam transmitted from the scale among said plurality of light beams.

* * * * *